(12) United States Patent
Wang

(10) Patent No.: US 6,622,898 B1
(45) Date of Patent: Sep. 23, 2003

(54) ADJUSTABLE VEHICLE TOP RACK ASSEMBLY

(76) Inventor: Chiu Kuei Wang, No. 101-19, Chung Cheng Li, Yuanli, Miaoli Hsien (TW)

( * ) Notice: Subject to any disclaimer, the term of this patent is extended or adjusted under 35 U.S.C. 154(b) by 0 days.

(21) Appl. No.: 10/104,008

(22) Filed: Mar. 25, 2002

(51) Int. Cl.[7] .................................................. B60R 9/045
(52) U.S. Cl. ........................ 224/321; 224/322; 224/325
(58) Field of Search .................................. 224/321, 322, 224/323, 319, 325, 331

(56) References Cited

U.S. PATENT DOCUMENTS

| | | | | |
|---|---|---|---|---|
| 4,496,089 A | * | 1/1985 | Eklund | 224/329 |
| 5,556,221 A | * | 9/1996 | Brunner | 403/322.4 |
| 5,730,343 A | * | 3/1998 | Settelmayer | 224/321 |
| 5,769,292 A | * | 6/1998 | Cucheran et al. | 224/324 |
| 5,845,828 A | * | 12/1998 | Settelmayer | 224/321 |

* cited by examiner

*Primary Examiner*—Stephen P. Garbe
(74) *Attorney, Agent, or Firm*—Rosenberg, Klein & Lee

(57) ABSTRACT

A top rack assembly includes two rails (100) connected on a top of a vehicle and two transverse bars (10) having two clamp devices (20) which are movably connected to the two rails. Each of the clamp devices has a casing (21) with a passage through which one of the two ends of each of the transverse bars movably extends. An L-shaped first part (221) is pivotally engaged with the passage and mounted on a top and a side of the rail. A second part (222) is pivotally connected to the first part and a bolt (23) extends through a vertical portion of the casing and contacts the second part to clamp the rail.

3 Claims, 5 Drawing Sheets

ADJUSTABLE VEHICLE TOP RACK ASSEMBLY

The present utility model relates to a transverse bar that has two clamp devices which are movably mounted on the transverse bar so as to be used on rails having different distances.

A conventional top rack assembly for vehicles is shown in FIG. 8 and generally includes two rails 41 (only one is shown) on two sides of a vehicle top 40 and two transverse bars 50 (only one is shown) are connected between the two rails 41. Luggage can be put and secured on the transverse bars 50. Two clamp devices 51 (only one is shown) are connected on two ends of each of the transverse bars 50 and each of which includes a toothed belt 54 which goes around the rail 41 and is inserted in an engaging member 53. A lever 52 is reciprocatingly operated to pull and fasten the toothed belt 54 to the rail 41. A cap 55 is used to cover the clamp device 51. The distance between the rails 41 is fixed so that the conventional clamp devices 51 are fixed to the transverse bars 50. A new pair of transverse bars 50 should be purchased if the distance between the rails 41 on different vehicles is changed.

The present utility model relates to a top rack assembly which comprises two rails connected on a top of a vehicle and two transverse bars each having two clamp devices movably connected to two ends thereof. Each of the clamp devices has a casing which has a horizontal portion and a vertical portion. A passage is defined through a conjunction of the horizontal portion and the vertical portion so that one of the two ends of each of the transverse bars movably extends through the passage. A first part has a horizontal plate pivotally connected to the casing, and a vertical plate. A second part is pivotally connected to the horizontal plate with a torsion spring biased therebetween and a bolt extends through the vertical portion and contacts the second part. The rail is clamped by the first part and the second part.

The primary object of the present utility model is to provide a clamp device on each one of two ends of the transverse bar wherein the clamp devices can be movable on the transverse bar so as to be engaged with the rails with different distances therebetween.

The present utility model will become more obvious from the following description when taken in connection with the accompanying drawings.

IN THE DRAWINGS

Figure 1:
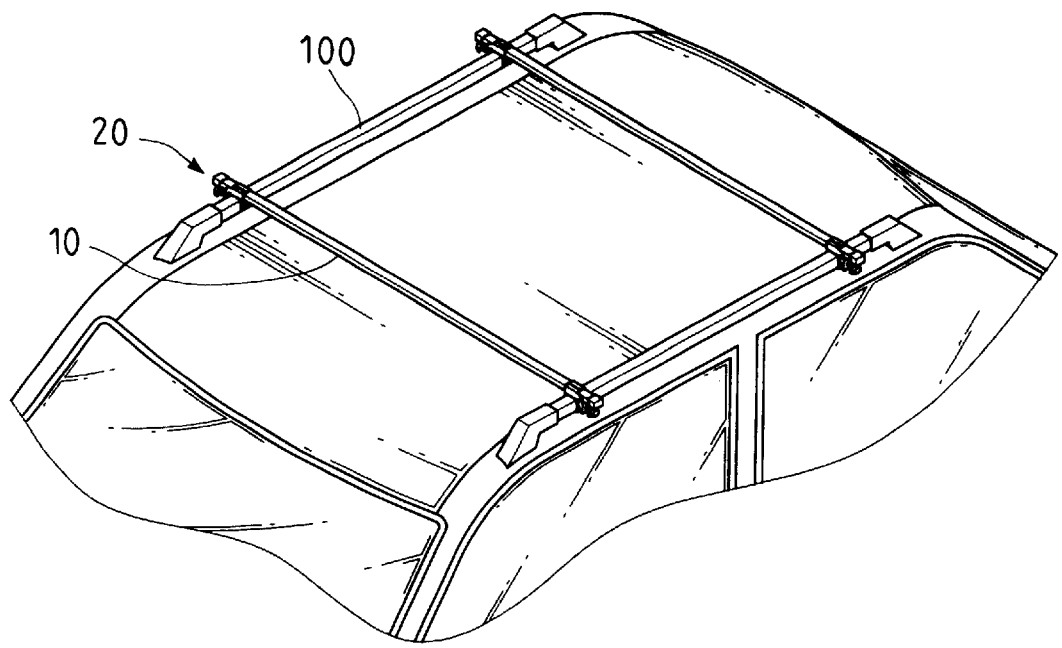
FIG. 1 is a perspective view to show the top rack assembly of the present utility model.
Figure 3:
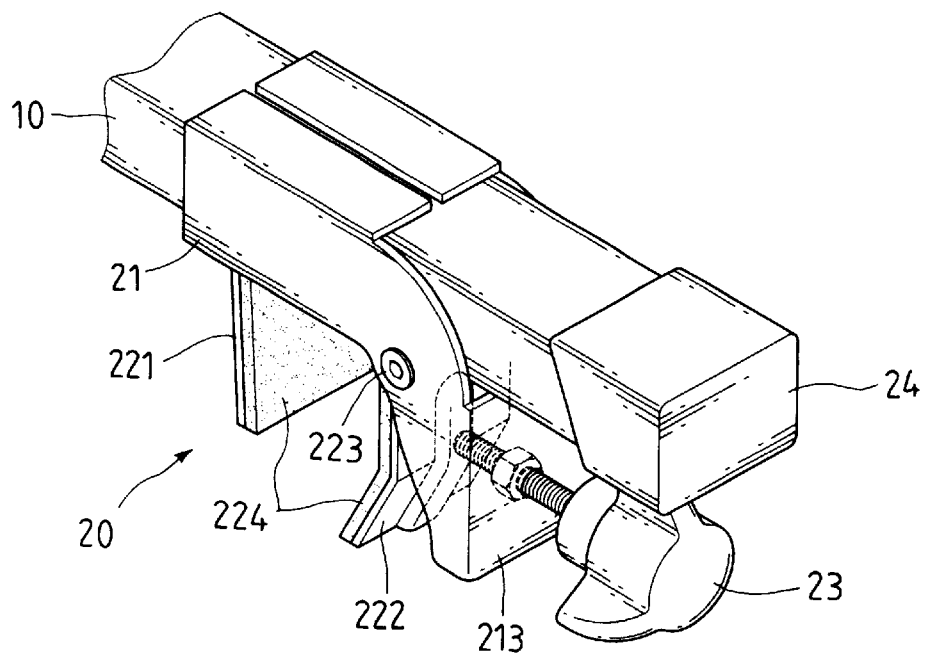
FIG. 3 is a perspective view to show the clamp device of the top rack assembly of the present utility model.
Figure 2:
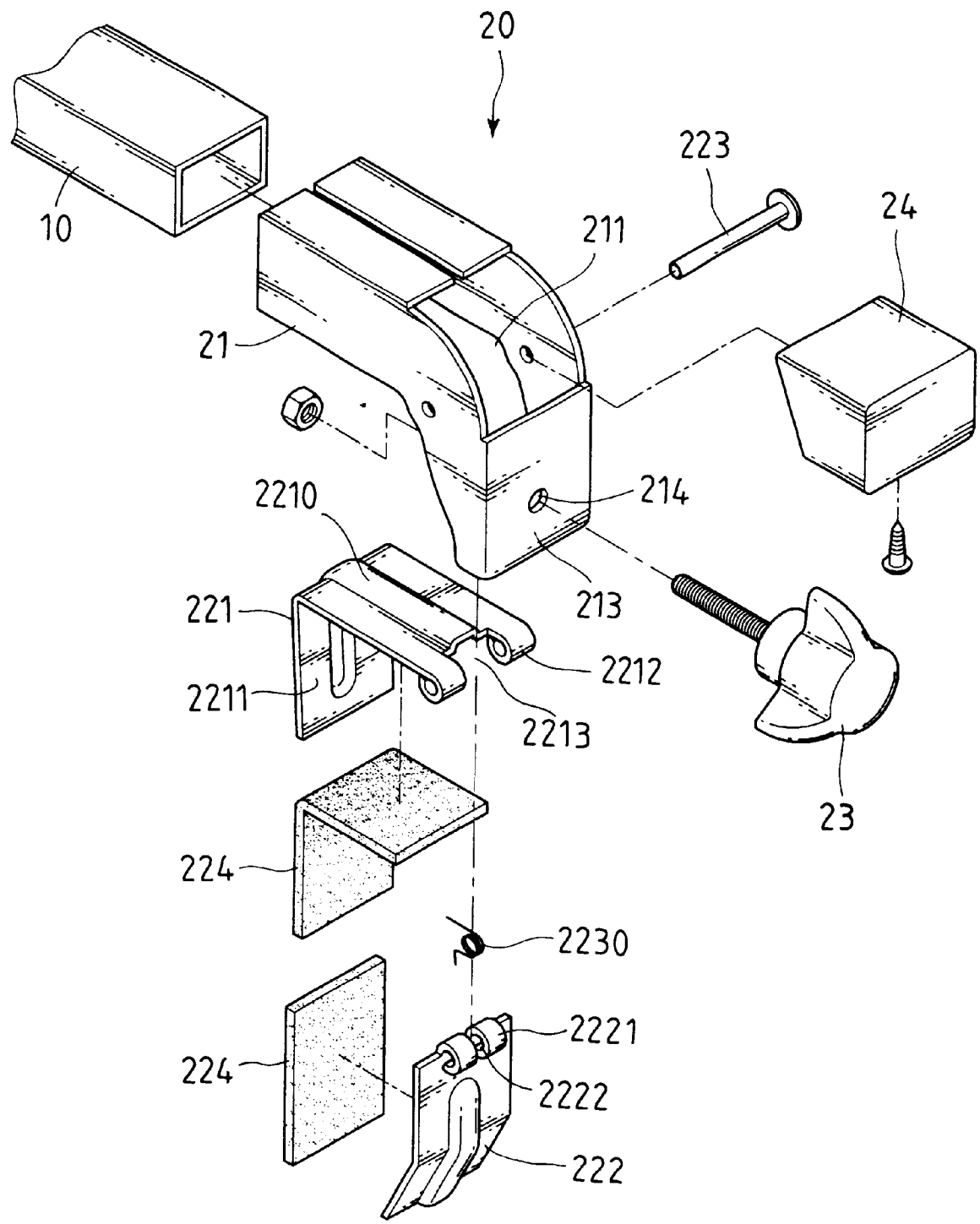
FIG. 2 is an exploded view to show the top rack assembly of the present utility model.

Referring to FIGS. 1 to 3, the top rack assembly of the present utility model comprises two rails 100 connected on a top of a vehicle and two transverse bars 10 are movably connected between the rails 100.

Each transverse bar 10 has two clamp devices 20 movably connected to two ends thereof. Each of the clamp devices 20 has a casing 21 which has a horizontal portion and a vertical portion. A passage 211 is defined through a conjunction of the horizontal portion and the vertical portion. One of the two ends of each of the transverse bars 10 movably extends through the passage 211. A first part 221 has a horizontal plate 2210 and a vertical plate 2211. The horizontal plate 2210 of the first part 221 has two first rings 2212 and a recess 2213 is defined between the two rings 2212. A second part 222 has two second rings 2221 and a recess 2222 is defined between the two second rings 221. The two second rings 2221 are received in the recess 2213 of the first part 221 and a torsion spring 2230 is engaged in the recess 2222 of the second part 222. A pin 223 extends through the casing 21, the four rings 2212 and 2221, and the torsion spring 2230 to make the second part 222 to be maintained in an open position. The horizontal plate 2210 is located on a top of one of the rails 100 and the vertical plate 2211 is located on a side of one of the rails 100. The second part 222 is located on another side of one of the rails 100. Each of the first part 221 and the second part 222 has a pad 224 connected to an inside thereof. A bolt 23 extends through a hole 214 of the vertical portion and contacts the second part 222 to securely clamp the rail 100. A cap 24 is connected to each one of the two ends of the transverse bars 10.

Figure 4:
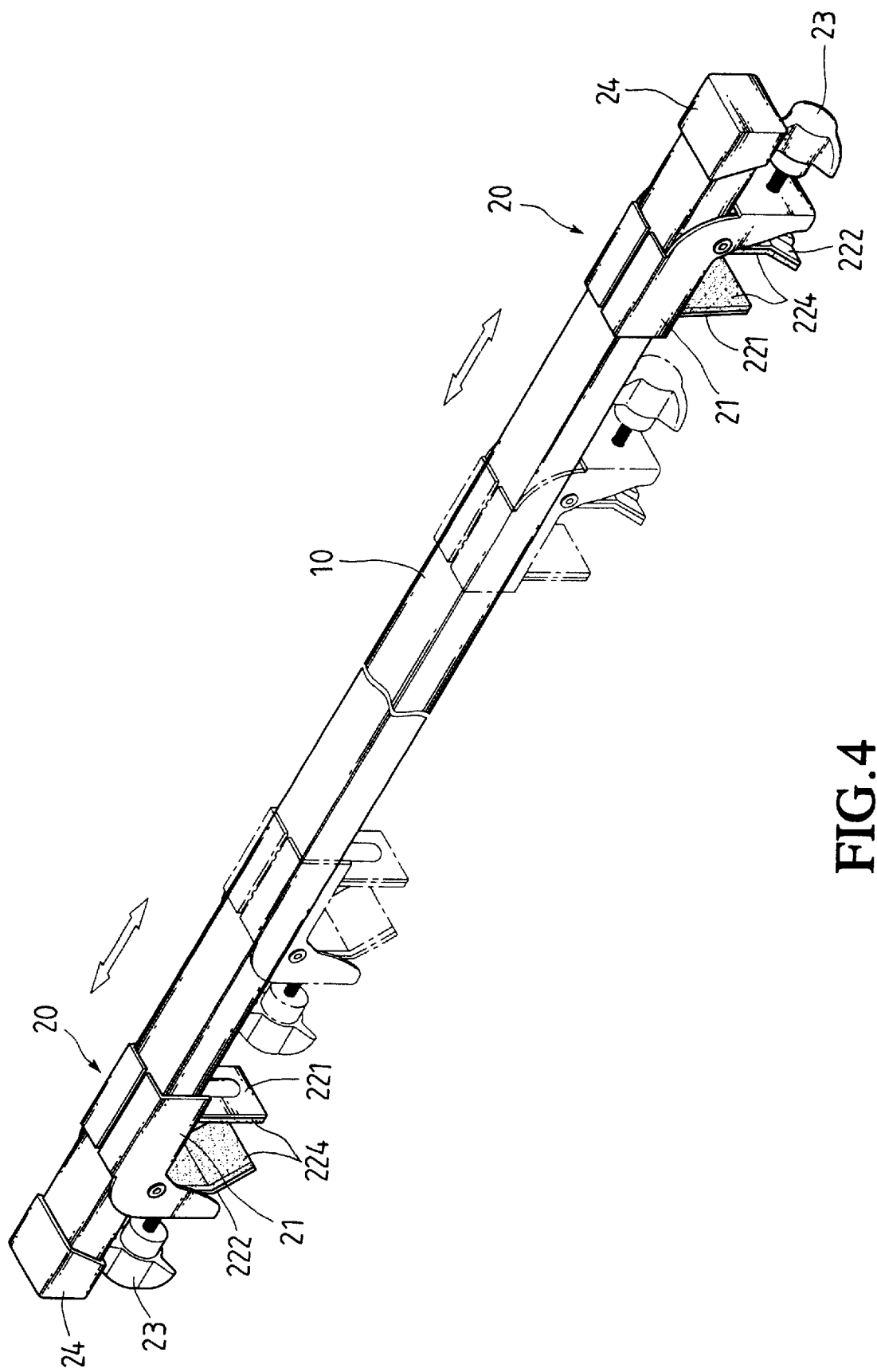
FIG. 4 is a perspective view to show the clamp devices movable on transverse bar of the top rack assembly of the present utility model.
Figure 5:
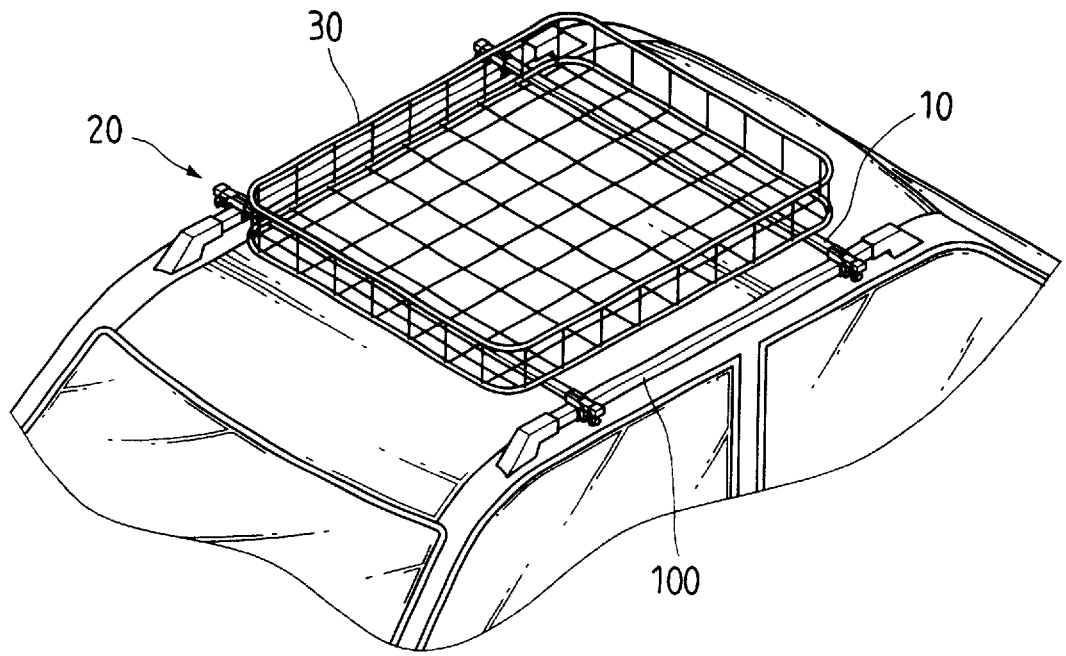
FIG. 5 is a perspective view to show a basket ox put on the transverse bar of the top rack assembly of the present utility model.

Referring to FIGS. 3 and 4, the first part 221 and the second part 222 can be loosened by unscrewing the bolt 23 so as to allow the clamp devices 20 to be moved on the transverse bar 10 so as to adjust the distance between the two clamp devices 20 and to be cooperated with rails with different distances therebetween. A basket 30 is put and positioned on the two transverse bars 10 on a top of a vehicle as shown in FIG. 5.

Figure 7:
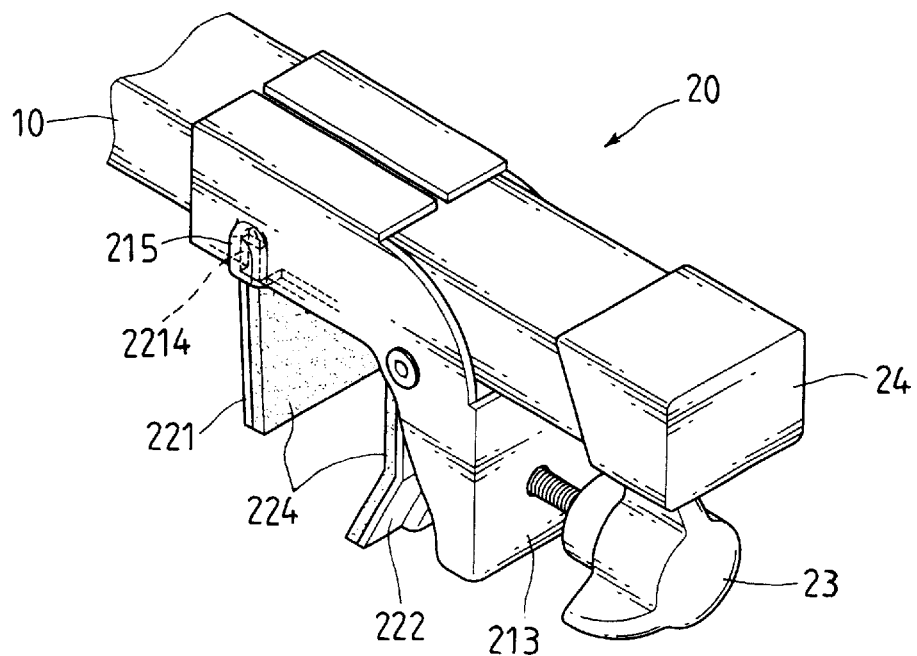
FIG. 7 is a perspective view to show the clamp device of the top rack assembly of the present utility model as shown in FIG. 6.
Figure 6:
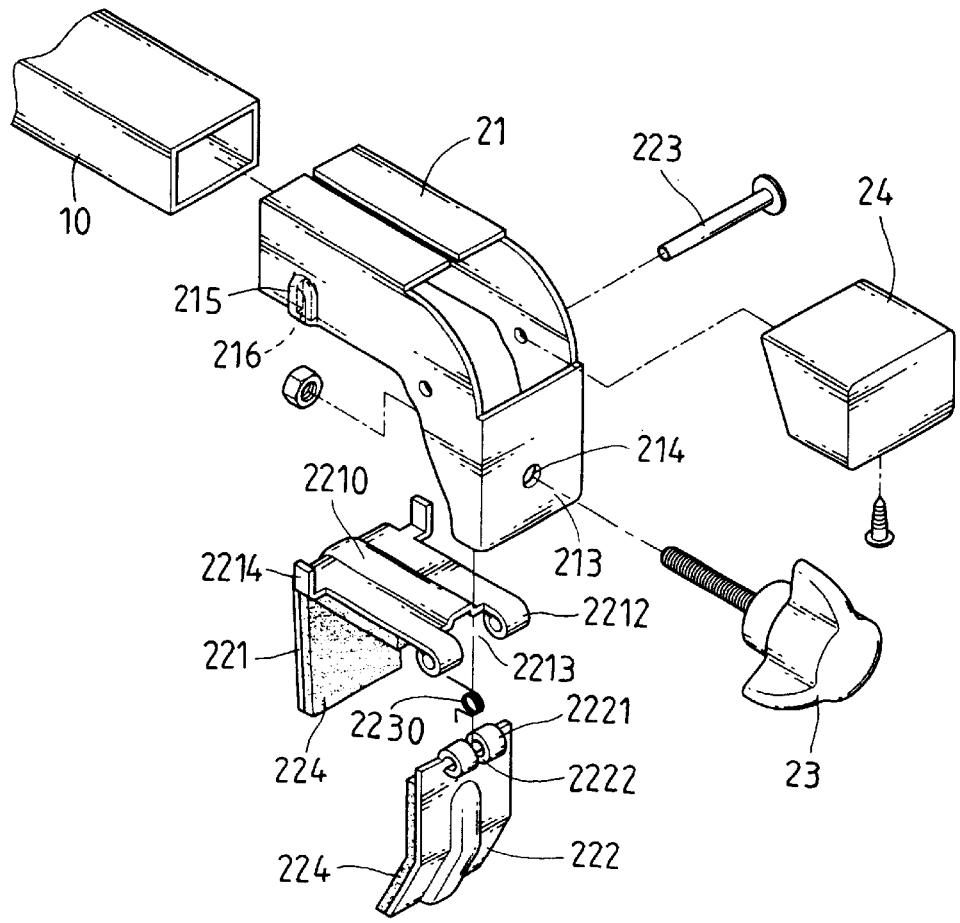
FIG. 6 is an exploded view to show another embodiment the top rack assembly of the present utility model.
Figure 8:
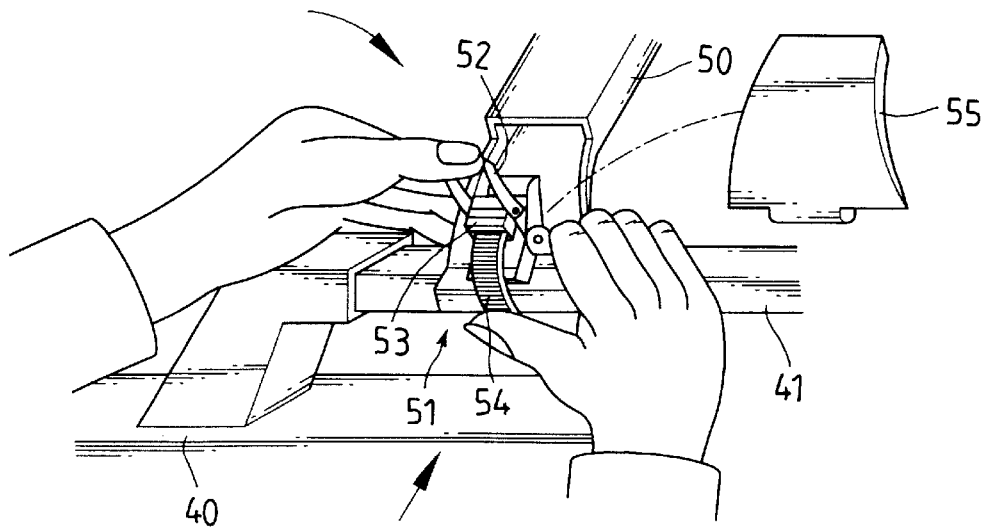
FIG. 8 is a perspective view to show the conventional top rack assembly.

As shown in FIGS. 6 and 7, the casing 21 may have two protrusions 215 on two sides thereof and the first part 221 has two insertions 2214 on two sides of the horizontal plate 2210. The two insertions 2214 are inserted in the two protrusions 215 from the recess 216 in an underside of each of the protrusions 215.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

While we have shown and described the embodiments in accordance with the present utility model, it should be clear to those skilled in the art that further embodiments may be made without departing from the scope of the present utility model.

What is claimed is:

1. A top rack assembly comprising:

two rails adapted to be connected on a top of a vehicle, and two transverse bars each having two clamp devices movably connected to two ends thereof, each of the clamp devices having a casing which has a horizontal portion and a vertical portion, a passage defined through a conjunction of the horizontal portion and the vertical portion, one of the two ends of each of the transverse bars movably extending through the passage, a first part engaged with the passage and having a horizontal plate and a vertical plate, the horizontal plate pivotally connected to the casing and adapted to be located on one of the rails, the vertical plate adapted to be located on a side of one of the rails, a second part pivotally connected to the horizontal plate and a bolt extending through the vertical portion and contacting the second part which is adapted to be located on another side of one of the rails.

2. The top rack assembly as claimed in claim 1, wherein the casing has two protrusions on two sides thereof and the first part has two insertions on two sides of the horizontal plate, the two insertions inserted in the two protrusions.

3. The top rack assembly as claimed in claim 1, wherein the horizontal plate of the first part has two rings and a recess is defined between the two rings, the second part having two ring which is received in the recess of the first part, a torsion spring received between the two rings of the second part and a pin extending through the casing, the rings and the torsion spring.

* * * * *